United States Patent
Wall (10) Patent No.: US 7,272,123 B2
(45) Date of Patent: Sep. 18, 2007

(54) SYSTEM AND METHOD FOR HANDOFF PROCESSING

(75) Inventor: Stephen B. Wall, Reston, VA (US)

(73) Assignee: Nextel Communications, Inc., Overland Park, KS (US)

( * ) Notice: Subject to any disclaimer, the term of this patent is extended or adjusted under 35 U.S.C. 154(b) by 0 days.

(21) Appl. No.: 11/226,126

(22) Filed: Sep. 13, 2005

(65) Prior Publication Data

US 2006/0056351 A1     Mar. 16, 2006

Related U.S. Application Data (60) Provisional application No. 60/608,908, filed on Sep. 13, 2004.

(51) Int. Cl.
*H04Q 7/00* (2006.01)

(52) U.S. Cl. .................. 370/331; 370/352; 370/395.2; 455/436; 455/442

(58) Field of Classification Search ................ 370/310, 370/331, 332, 346, 352, 395.52; 455/436, 455/437, 438, 439, 440, 442, 443
See application file for complete search history.

(56) References Cited

U.S. PATENT DOCUMENTS

| | | | |
|---|---|---|---|
| 6,804,221 B1* | 10/2004 | Magret et al. .............. 370/338 |
| 6,985,463 B1* | 1/2006 | Wright et al. ............... 370/331 |
| 2002/0041576 A1* | 4/2002 | Chang et al. ............... 370/331 |
| 2003/0142642 A1* | 7/2003 | Agrawal et al. ............ 370/328 |
| 2004/0002337 A1* | 1/2004 | Wheeler et al. ............ 455/445 |
| 2004/0246933 A1* | 12/2004 | Valko et al. ................ 370/338 |
| 2005/0117524 A1* | 6/2005 | Lee et al. ................... 370/254 |

OTHER PUBLICATIONS

Mar. 29, 2006, International Search Report.

* cited by examiner

*Primary Examiner*—Chi Pham
*Assistant Examiner*—Shick Hom (57) ABSTRACT

A system and method for optimizing handoff processing in networks with fully collapsed base station routers is disclosed. In accordance with exemplary embodiments of the present invention, handoff processing is optimized by allowing base station routers to automatically discover, and maintain lists of, their neighbor base station routers. Using the list of discovered neighbor base station routers, a base station router polls its neighbors for a list of all active users. The base station router then polls the Context Transfer Server (CTS) database for these users' contexts. Accordingly, instead of polling the CTS database during handoff, the present invention allows a base station router to activate the context from local memory.

13 Claims, 11 Drawing Sheets

SYSTEM AND METHOD FOR HANDOFF PROCESSING

CROSS-REFERENCE TO RELATED APPLICATION

The present invention claims the benefit of U.S. Provisional Patent Application No. 60/608,908, filed Sep. 13, 2004, the disclosure of which is incorporated herein by reference.

FIELD OF THE INVENTION

The present invention relates generally to wireless communications systems and more particularly to systems and methods for handoff processing.

BACKGROUND OF THE INVENTION

Wireless communications systems typically include a plurality of base stations, each servicing mobile nodes within an associated coverage area. As a mobile node roams between base stations, it is desirable to transition active mobile sessions to the new base station. For example, it is desirable to have real-time or streaming applications such as Voice-over-Internet Protocol (VoIP) continue without interruption and without loss of data packets. The user experience can be adversely affected if there are lengthy processing delays or other interruptions during the handoff process.

In a conventional handoff process, a mobile node first detects the new base station and negotiates a new communications link, which may include a new mobile IP address ("care of address") when the mobile node changes subnetworks. The mobile node next notifies its home network of the current binding between its home address and the mobile IP address. The home agent ensures that the mobile node maintains connectivity with the Internet as it traverses subnetworks.

During the handoff process, the destination base station polls the wireless communications system to determine the user's context so that mobile node's current Class of Service (CoS) can be maintained after the handoff. Context information may include data relating to security, policy, Quality of Service (QoS), header compression and other information. Retrieving and establishing the mobile node's current context at the destination base station router is time consuming and may delay the handoff. Further delays may be found where the source and destination base stations operate on different subnets, or with different technologies or protocols.

In view of the above, there is a need for an improved system and method for handling handoff processing.

SUMMARY OF THE INVENTION

The present invention is a system and method for handoff processing between base station routers. In one embodiment a method for handoff processing between a source base station and a destination base station first involves discovering an IP address of a first mobile node registered on the source base station. Next, a context of the first mobile node is stored in a cache of the destination base station. A handoff request from the first mobile node is then processed. The stored context is applied to the first mobile node on the destination base station.

In another embodiment, a base station router includes a control processor, a cache memory and a program memory. The program memory includes program instructions for causing the control processor to perform steps including discovering an IP address of a first mobile node registered on a neighboring base station, storing a context of the first mobile node in the cache, and processing a handoff request from the first mobile node, including registering the first mobile node for use on the base station and applying the stored context to the first mobile node.

In an alternative embodiment, the program memory includes a neighbor discovery function adapted to retrieve a neighbor base station IP address from a handoff process. The program memory also includes a neighbor polling function for discovering the IP address of the first mobile node, including polling a neighbor base station for an IP address of each active mobile node on the neighbor base station, and receiving from the neighbor base station the IP address of the first mobile node.

In another embodiment, a wireless network comprises a CTS server storing a mobile node context, a home agent adapted to forward IP communications directed to a home address of the mobile node to a local IP address assigned to the mobile node, a first base station providing wireless communications with the mobile node, and a second base station storing a context of the mobile node.

In another embodiment, a method for handoff processing between base station routers includes establishing dual uplinks between the mobile node and each of the first and the second base station routers, setting a mobile node context, creating a low-priority tunnel between the pair of base station routers, performing a MIP update for the mobile node, and removing the temporary tunnel.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

An exemplary embodiment of the present invention will be described with reference to FIG. 1. A wireless communications system 2 includes a base station router (BSR) 4 providing wireless communications services to a mobile node (MN) 6 within a coverage area 8. The BSR 4 includes a memory storing a neighbor IP list 10 of known neighboring base stations, if any, and context information 12 relating to a state of active mobile nodes serviced by the identified neighboring base stations.

The mobile node 6 communicates with the BSR 4 by exchanging data according to a predetermined digital communications protocol, such as time division multiple access (TDMA). It will be appreciated that in alternate embodiments the BSR 4 may support other multiple-access wireless communications systems and protocols, such as code division multiple access (CDMA), wideband CMDA (WCDMA), Advanced Mobile Phone Service (AMPS), Global System for Mobile Communications (GSM), General Packet Radio Services (GPRS), High Data Rate (HDR) technology, Push-to-Talk over Cellular (PoC) or voice and data services provided over a broadband network such as WiFi, WiMax, an 802 protocol or similar system.

The BSR 4 facilitates at least one mode of wireless communication such as interconnect, dispatch, email, short messaging service (SMS), multimedia messaging service (MMS) and packet data communications. The MN 6 may be any device that is adapted for communication with the BSR 4 such as a mobile phone, pager, personal digital assistant (PDA), a Personal Computer Memory Card International Association (PCMCIA) card, or portable computer. In the exemplary embodiment, the BSR 4 and MN 6 are adapted to exchange packet data communications using the Internet Protocol.

Figure 1:
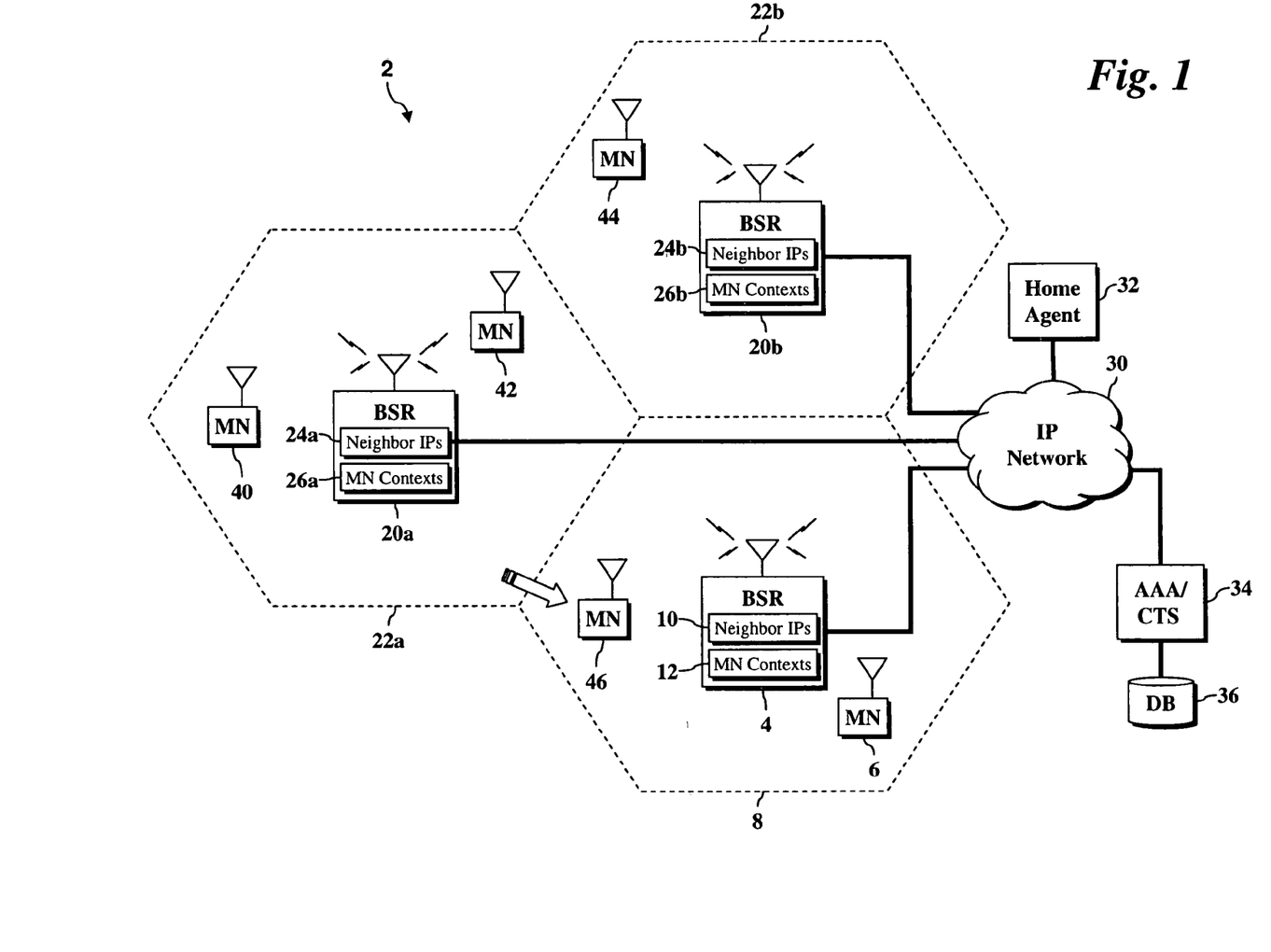
FIG. 1 illustrates an embodiment of the present invention.

It will be appreciated that the wireless communications system 2 illustrated in FIG. 1 is exemplary and that alternative configurations and network components may be implemented within the spirit and scope of the exemplary embodiment of the present invention. For example, the wireless communications system may include a plurality of base stations, base station controllers, mobile switching centers, Home and Visitor Location Registers, presence and location servers, and other wireless communications equipment.

The BSR 4 is also connected to an IP network 30, such as the Internet, which facilitates communications with at least one home agent (HA) 32. The home agent 32 routes communications to the MN 6 as it roams the wireless communications system 2. An Authentication, Authorization and Accounting (AAA) entity 34 includes a Context Transfer Server (CTS) and maintains associated subscriber data 36, including the present context of the mobile node 6.

As illustrated, two neighboring base station routers, 20a and 20b, provide wireless services to mobile nodes within their respective coverage areas 22a and 22b, respectively. As used herein, a neighboring base station router of BSR 4 refers to any base station from which a mobile node may be handed off to the BSR 4, or vice versa. For example, the neighboring base stations may include base stations that belong to the same network as the base station 4, belong to a different network or subnetwork, operate on a different administrative domain, or operate on a different technology or protocol.

In operation, a plurality of mobile nodes 40, 42, 44 and 46 actively communicate with the base station routers 20a and 20b. Each mobile node has an associated home network and has a local "care of address" on the wireless network 2 that was assigned when it registered with the base stations 20a or 20b. Each mobile node registers its "care of address" with the home agent 32 which in turn routes packet data directed to the mobile node to the "care of address." The present context of each mobile node is maintained by the AAA/CTS 34.

When an active mobile node 46 moves from one cell (22a) to another (8), a handoff process may be initiated. In accordance with the exemplary embodiment, handoff processing is optimized by enabling the BSR 4 to automatically discover and maintain the list of neighboring base station routers 10. Using the list 10, the base station router 4 polls each neighboring base station 20a and 20b for a list of active mobile nodes 12. The base station router 4 then polls the CTS server 34 for a stored mobile node context associated with each identified mobile node 12. Context information is returned to, and stored by, the base station 4 and may include information relating to AAA, security, policy, Quality of Service (QoS), header compression and other information. By polling the CTS database 36 before handoff, the base station router 4 may immediately activate the context from local memory during the handoff process without significant delay.

Figure 2:
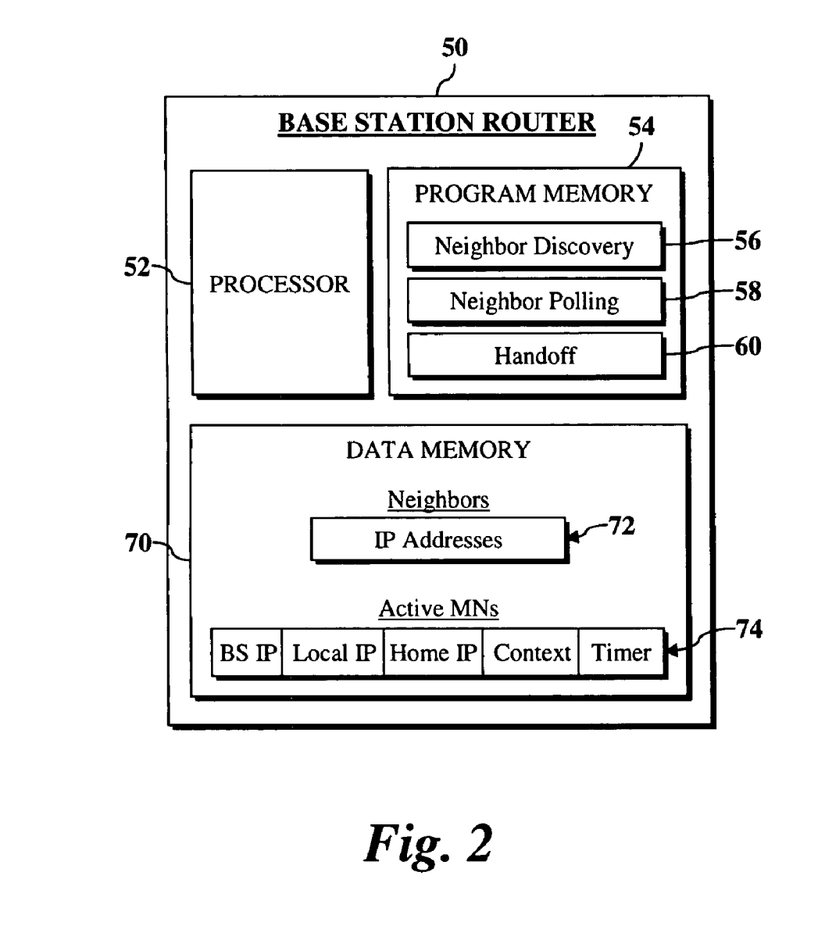
FIG. 2 illustrates an embodiment of a base station router.

An embodiment of a base station router 50 will be described in further detail with reference to FIG. 2. The BSR 50 includes a processor 52, a program memory 54 storing program instructions for instructing the processor 52, and a data memory 70. The program memory 54 includes a neighbor discovery function 56 used to discover the IP addresses of neighboring base stations, and a neighbor polling function 58 for querying neighboring base stations for the IP addresses of active mobile nodes. The program memory 54 also includes a handoff function 60 for facilitating handoffs between the base station router 50 and a neighboring base station using the discovery and caching features of the present embodiment. The data memory 70 stores IP addresses of neighboring base stations 72, and data 74 listing active mobile nodes and associated context information. In one embodiment, the data 74 includes a neighboring base station IP address, a local IP address assigned to the mobile node by the network, a home IP address for the mobile node, a context of the mobile node, and a timer establishing an expiration for the data.

Figure 3:
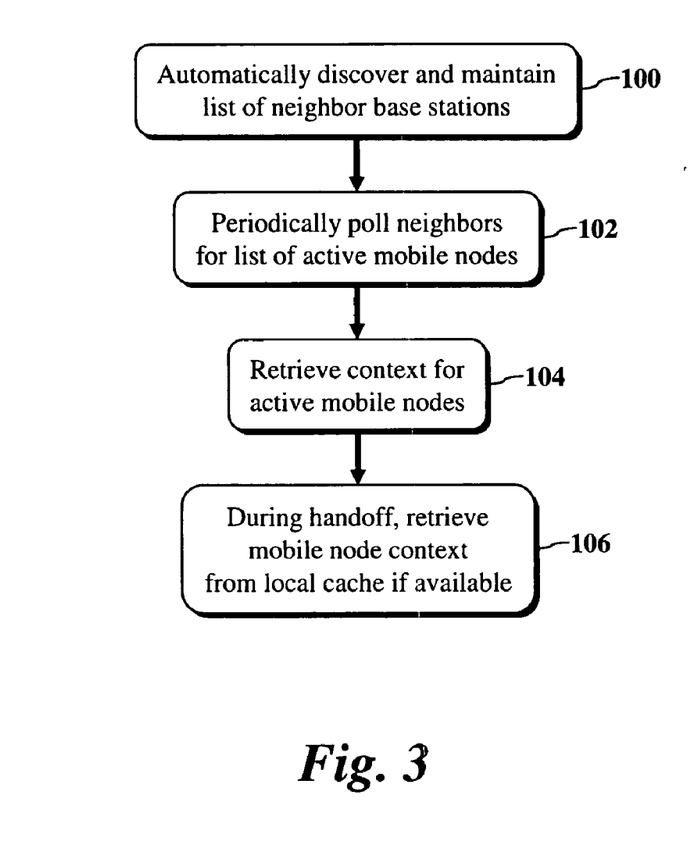
FIGS. 3 illustrates an embodiment of an operation of the base station router of FIG. 2.

Referring to FIG. 3 an embodiment of the operation of the base station router 50 will now be described. In step 100, the base station router 50 automatically discovers and maintains a list of neighboring base stations. In one embodiment, the base station router 50 stores the IP address of each base station involved in a handoff process with the base station router 50. In an alternate embodiment, neighboring base stations may be identified through a domain host control protocol (DHCP) service discovery. In step 102, the base station router 50 periodically polls identified neighbor base stations for the IP address of each active mobile node serviced by the respective neighbor base station. It is anticipated that an appropriate time interval between polling for active users will depend on a variety of factors including network configuration, network utilization and frequency at which the data is expected to change. In step 104, the base station router retrieves the context for each of the identified active mobile nodes by querying the home AAA/CTS database. The context is stored in a local cache memory 74. In step 106, during a handoff operation in which a mobile node has moved into the coverage area of the base station router 50, the mobile node context is quickly retrieved from local cache memory 74, if available, avoiding the more time intensive query of the AAA/CTS database during handoff processing.

Figure 4A:
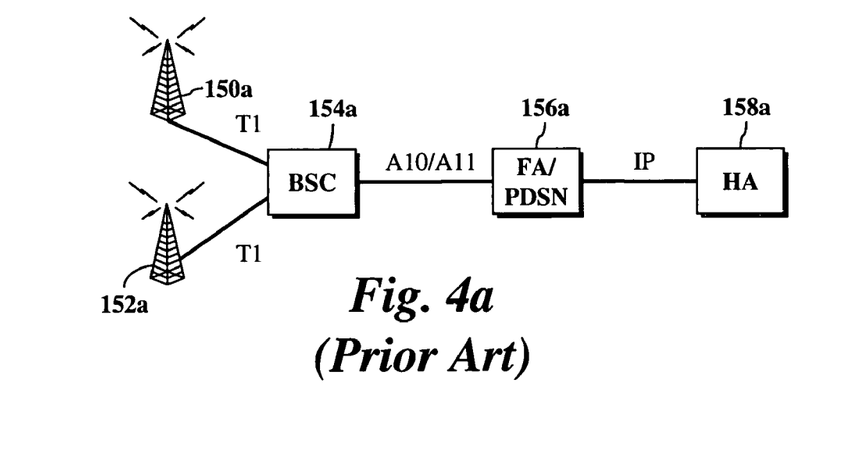
FIGS. 4a-c illustrate base station configurations, including an embodiment of a fully collapsed base station router.
Figure 4B:
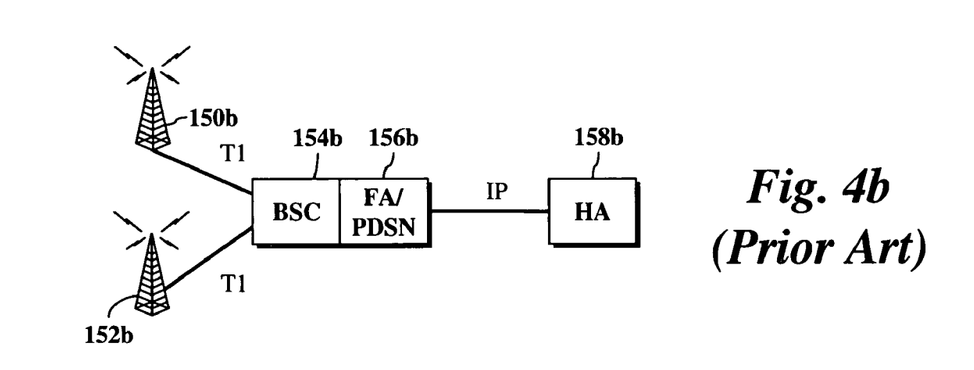
Figure 4C:
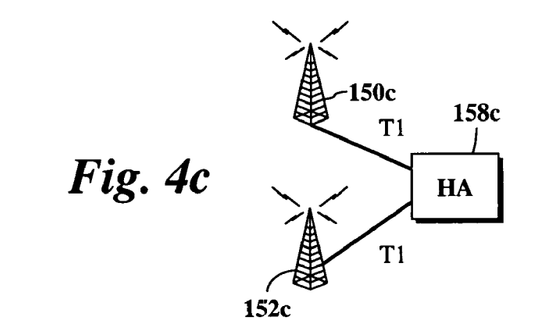

In the exemplary embodiment, the base station router 50 is a fully collapsed base station router as illustrated in FIGS.

4a-c. In FIG. 4a, base stations 150a and 152a are connected to a base station controller (BSC) 154a via T1 lines, and the BSC 154a is connected to a Foreign Agent/Packet Data Serving Node (FA/PDSN) 156a via an A10/A11 interface. The FA/PDSN 156a communicates with a home agent 158a for a mobile node via an IP connection. FIG. 4b illustrates a partially collapsed architecture of the embodiment in FIG. 4a in which the FA/PDSN 156b is maintained as part of the BSC 154b.

FIG. 4c illustrates an exemplary fully collapsed base station router architecture in accordance with an embodiment of the present invention. In this embodiment the foreign agent and base station controller are collapsed into the base stations 150c and 152c, allowing the base stations to communicate with the home agent 158 via a T1 line. Compared to the architectures of FIGS. 4a and 4b, the architecture of FIG. 4c has the advantage of low latency and enables mobile IP (MIP) based micro- and macro-mobility. There are a large number of wireless IP networks that may be supported by this architecture such as Personal Area Networks (PANs), Local Area Networks (LANs), satellite, cellular WANs, WiMAX and 3G and 4G systems.

In micro-mobility handoff processing, routing occurs without the Mobile IP address change. Micro-mobility handoff processing in a fully collapsed base station router architecture of the present embodiment includes establishing dual uplinks with each of a pair of base stations, user context establishment via CTS on destination base station router or via cache, temporary low-priority tunnel between base station routers, a MIP update, and tearing down of the temporary tunnel.

The exemplary handoffs illustrated in FIGS. 5 through 9 can be characterized based on the information in the following table:

| Source BSR | Destination BSR | Mobility Scheme | Destination Region |
|---|---|---|---|
| A | B | Micro | Home |
| B | C | Macro | Remote |
| C | D | Micro | Remote |

In the mobility management scheme of the exemplary embodiment, the AAA/CTS subscriber database is unified and distributed. Each mobile node's record is maintained by the corresponding HA, and each mobile node tracks its HA and last known serving HA (currentHA) in volatile memory. Each base station router is configured with a corresponding serving HA (localHA).

The following is exemplary pseudo-code for the MIP update portion of all handoff processing:

```
IF {localHA=HA} {
    MIP binding update HA → destBSR
} ELSE {
    MIP binding update localHA → destBSR
    IF {currentHA!=localHA} {
        MIP binding update HA → localHA
    }
}
```

Figure 5A:
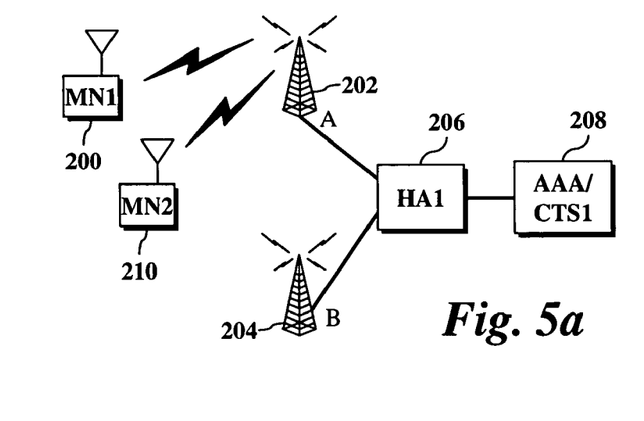
FIGS. 5a-d illustrate a handoff process in accordance with an embodiment of the present invention.
Figure 5B:
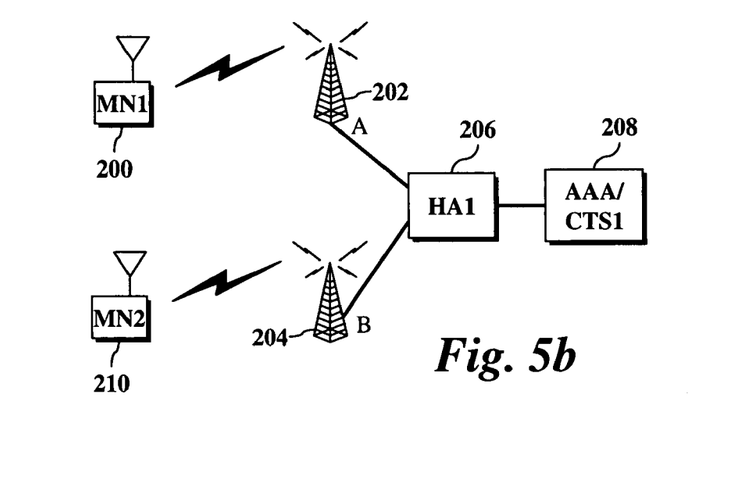
Figure 5C:
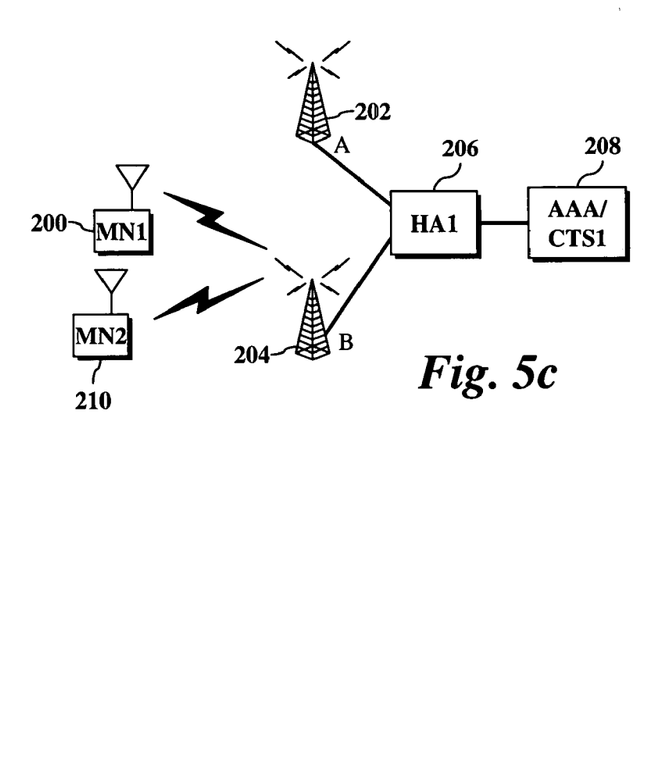
Figure 5D:
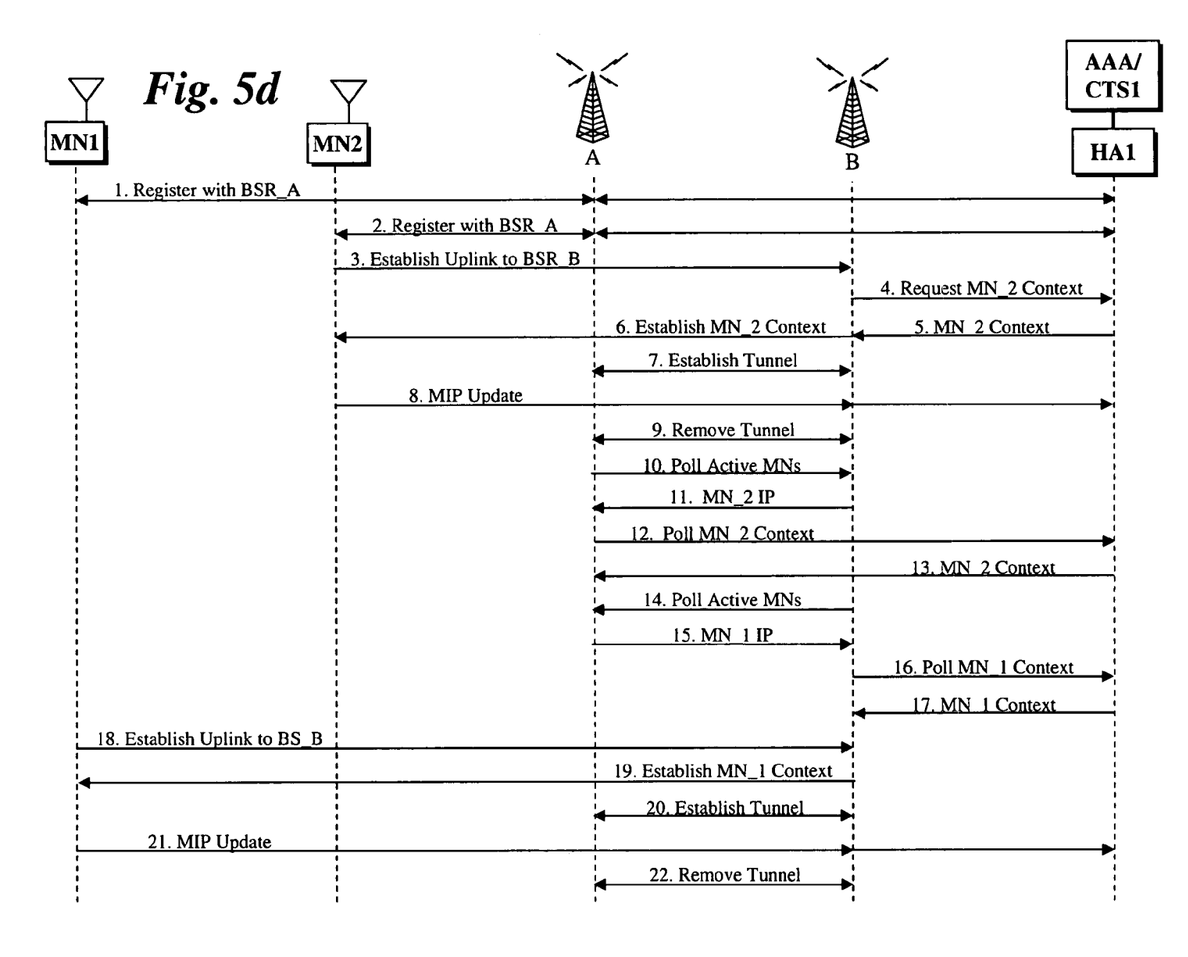

FIGS. 5a-d illustrate an exemplary system and method for micro-mobility within a home region. Specifically, FIGS. 5a-c illustrate exemplary handoff processing from base station router A to base station router B using the discovery and cache features described herein. An exemplary handoff process is illustrated in FIG. 5d and will be described with reference to FIG. 5a. First, mobile node 1 (MN1) 200 registers with base station router A (BSR_A). Next, mobile node 2 (MN2) 210 registers with BSR_A. Referring to FIGS. 5b and 5d, in step 3, MN2 establishes an uplink to base station router B (BSR_B) 2002. In step 4, BSR_B requests the MN_2 context from the CTS1 and then establishes the MN2 context received from the CTS1. In this embodiment, the base station router B starts without knowledge of neighboring base stations or neighboring mobile nodes, so the context is retrieved from the home network. The handoff of mobile station 1 from base station router A to base station router B does not benefit from auto neighbour discovery or context caching, but all future handoffs between base station router A and base station router B will benefit from instantaneous context activation provided via the mechanisms of auto neighbour discovery and context transfer.

A temporary tunnel is next established between base station router A and base station router B to redirect communications received at base station A to MN2 through base station B. A MIP Update is then performed notifying the HA to direct traffic to the MN2 through base station router B.

As a result of the handoff process, base station routers A and B are now aware that they are neighbors, and each stores the other's IP address in its neighbor list. In step 10, base station router A polls base station router B for active mobile nodes. Base station router B returns a list of active mobile nodes, including the IP address of MN_2. Base station router A then polls the CTS1 for the MN_2 context, which it receives and stores in the cache. Similarly, in step 14 base station router B polls base station router A for active mobile nodes. Base station router A returns the IP address of MN_1 and other active mobile nodes. In steps 16 & 17, base station router B retrieves the context for MN1 and stores the context in its local cache.

Referring to FIGS. 5c and 5d, MN1 roams into the coverage area of BSR_B and in step 18 establishes an uplink to the BSR_B. BSR_B returns the current context of MN_1 as stored in the local cache. Next, a temporary low priority tunnel is established between BSR_A and BSR_B, a MIP update is performed in step 21 via BSR_B, and the temporary low-priority tunnel is removed in step 22. In one embodiment, the MIP update is performed in accordance with the following pseudo-code:

```
HA=HA1
localHA=HA1
currentHA=HA1
IF {localHA=HA} {
    MIP binding update HA → destBSR
} ELSE {
    MIP binding update localHA → destBSR
    IF {currentHA!=localHA} {
        MIP binding update HA → localHA
    }
}
```

In the exemplary embodiment, neighbor auto-discovery takes place during the first handoff between any two base station routers. Upon base station router reboot, these lists may need to be re-established dynamically. Neighbor auto-discovery could also be extended to operate across networks within different administrative control and using various IP based access technologies.

Certain application specific context information such as SIP call state may be problematic to cache on all base station routers adjacent to the base station router holding the active call. This issue could be eliminated if call state is maintained within the core network and the appropriate proxy call state control function (P-CSCF) is implemented on the base station router.

In one embodiment, each context cache for a mobile device has an associated timeout to avoid over aggressive signaling which could impact backhaul load or under aggressive signaling which would nullify the advantages of context caching.

Figure 6A:
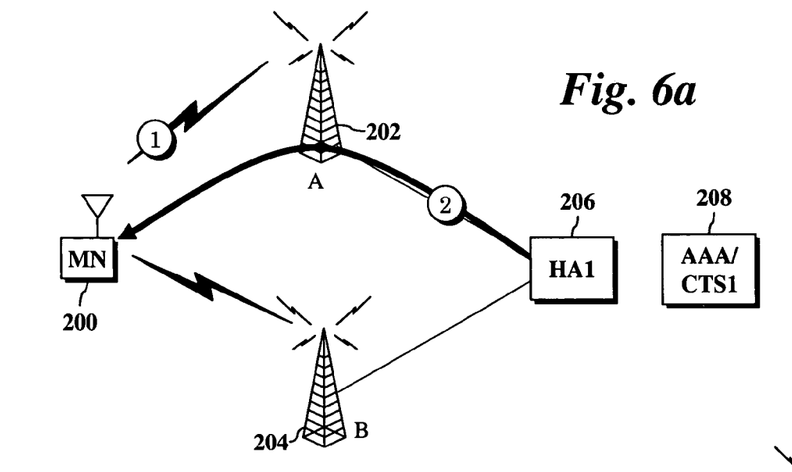
FIGS. 6a-c illustrate an embodiment of micro-mobility within a home region.
Figure 6B:
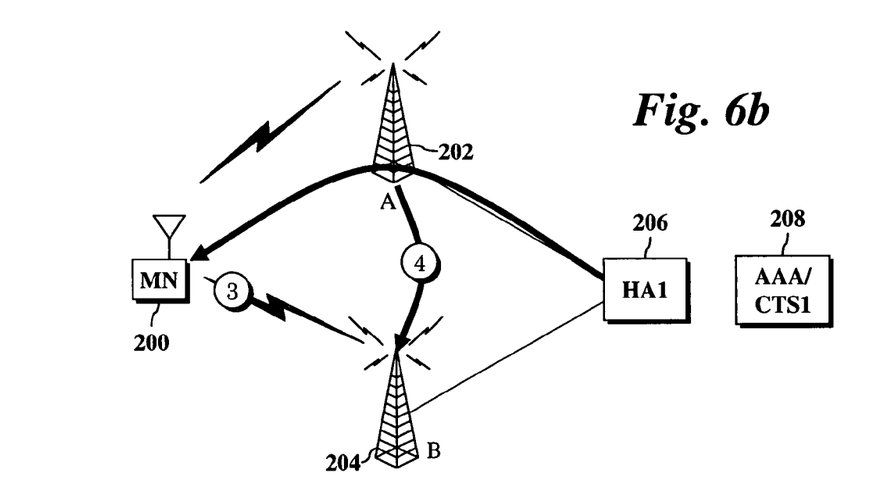
Figure 6C:
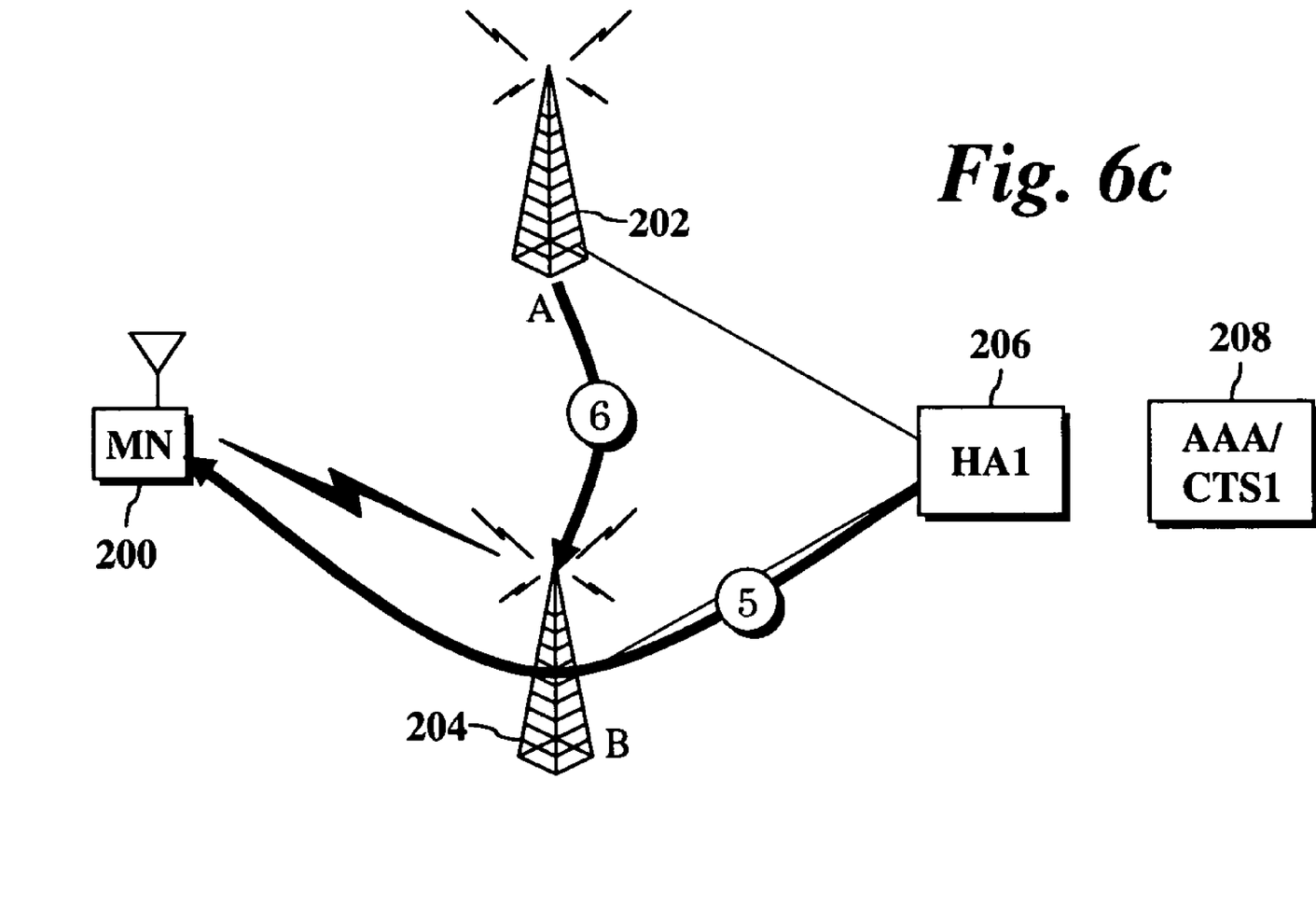

FIGS. 6a-b illustrates another representation of micro-mobility from base station router A to base station router B. Referring to FIG. 6a, first the mobile node 200 registers with the base station A (202). Second, the home agent 206 routes incoming IP packets to MN 200 through the base station A. Referring now to FIG. 6b, third the mobile node establishes an uplink with base station B (204). Fourth, a temporary low priority tunnel is established between the base stations A and B to redirect incoming traffic from the home agent 206 to the base station B. Referring to FIG. 6c, the home agent redirects communications to the mobile node through the base station router B in step five. In step six, the temporary tunnel is torn down and handoff is complete.

Figure 7A:
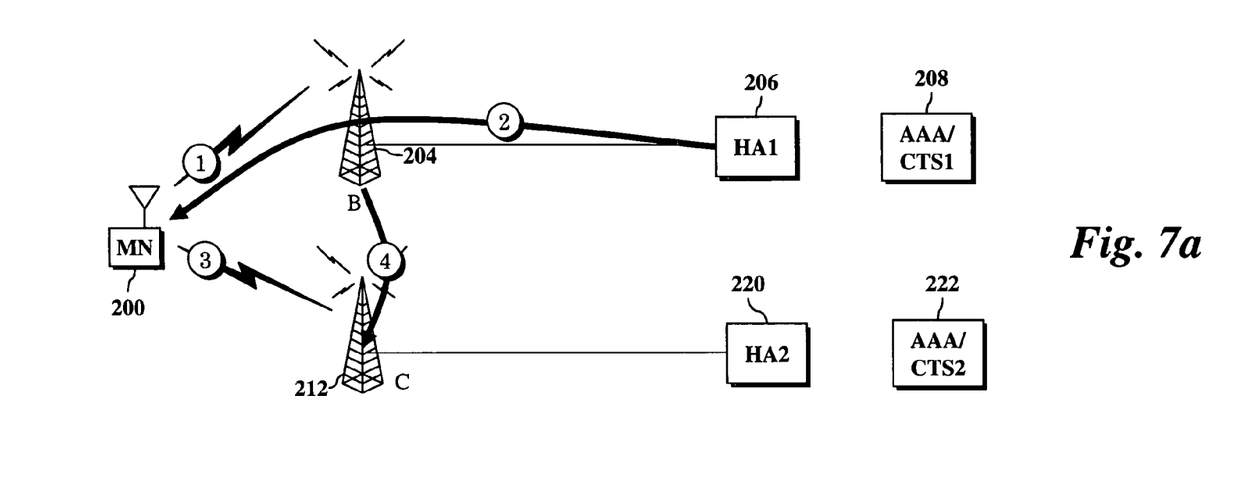
FIGS. 7a-b illustrate an embodiment of macro-mobility across regions in accordance with the present invention.
Figure 7B:
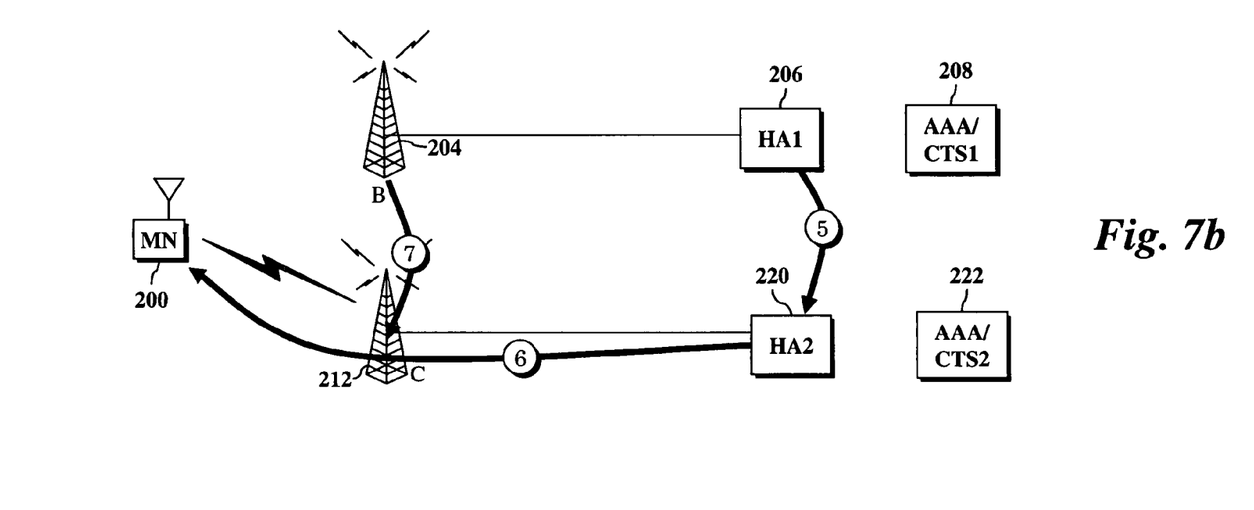

FIGS. 7a-b illustrate macro-mobility across regions in accordance with an exemplary embodiment of the present invention. Specifically, these figures illustrate handoff processing from base station router B to base station router C. As illustrated, the network is divided into two regions, with each region supported by its own Home Agent (HA) 206 and 220, respectively. The mobile node in this example is provisioned with a static IP address routed by HA1. In FIG. 7a the mobile node 200 first registers with base station B. Second, after a MIP update, the home agent routes IP data packets to the mobile node through the base station B. Third, the mobile node establishes an uplink with base station C. The user context is established via CTS2 from base station router C or through local cache memory if available. Fourth, a temporary tunnel is established between base station B and base station C. Referring to FIG. 7b, fifth, after a MIP update, a tunnel is established between home network 206 and home network 220 so that HA1 routes IP packet data through HA2 and, sixth, via base station router C to mobile node 200. Seventh, the temporary tunnel is torn down and the handoff process is complete.

In one embodiment, the MIP updates in accordance with FIGS. 7a and 7b are performed in accordance with the following pseudo-code:

```
HA=HA1
localHA=HA2
currentHA=HA1
IF {localHA=HA} {
    MIP binding update HA → destBSR
} ELSE {
    MIP binding update localHA → destBSR
    IF {currentHA!=localHA} {
        MIP binding update HA → localHA
    }
}
```

Figure 8:
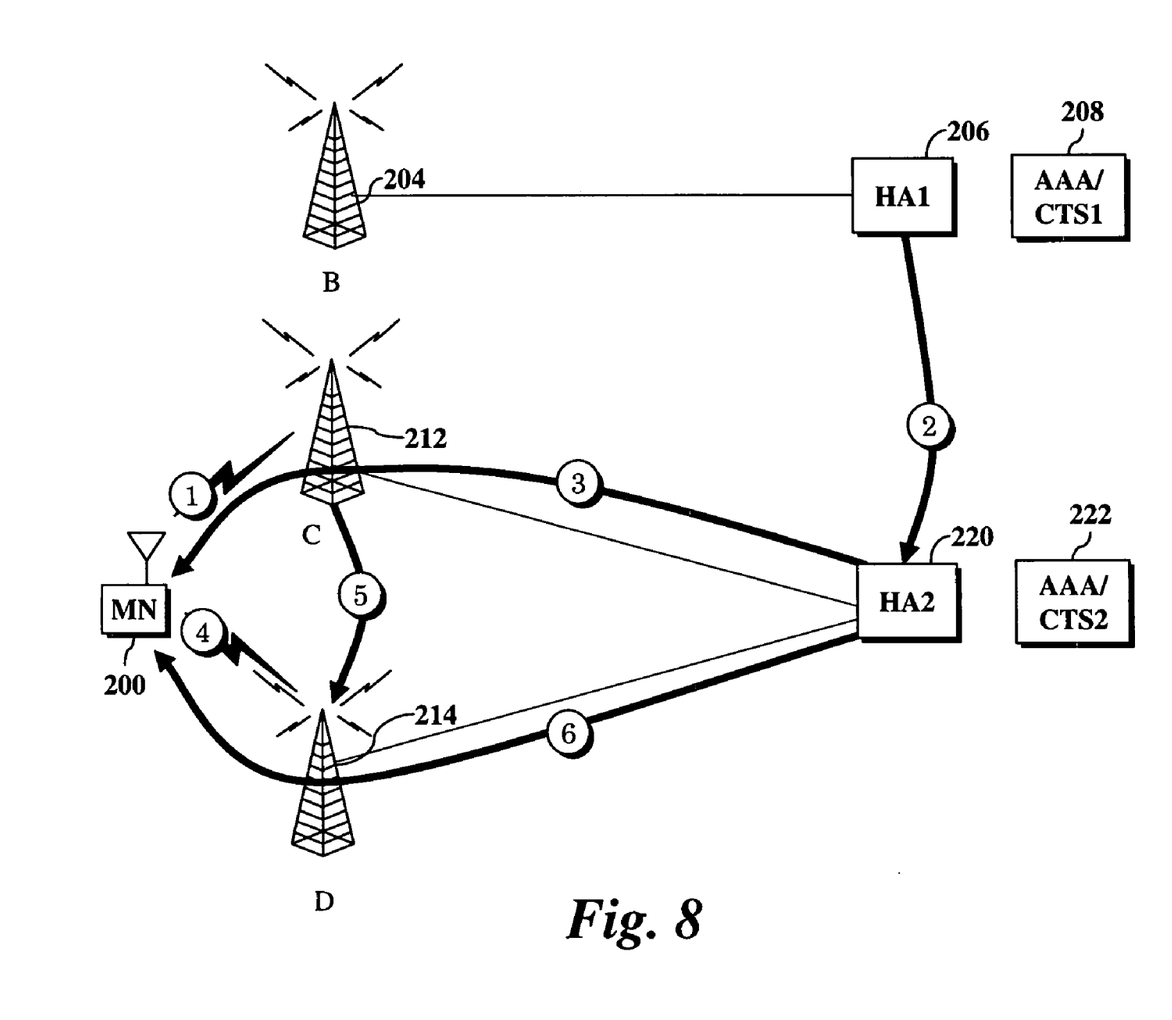
FIG. 8 illustrates micro-mobility within a remote region.

FIG. 8 illustrates an embodiment of micro-mobility within a remote region. Specifically, handoff processing from base station router C to base station router D is illustrated. First, mobile node 200 registers with base station C. Second, the home agent 206 routes incoming IP packets to regional home agent 220, which routes the packets to the mobile node in step 3. Fourth, dual uplinks with base station router C and base station router D are established and a user context is established via local cache or CTS2 on base station router D. Fifth, a temporary low-priority tunnel is established from base station router C to base station router D to redirect communications intended for mobile node 200 through base station router D. Sixth, MIP update via base station router D is next accomplished, which results in home agent 220 routing IP packets to mobile node 200 through base station D. The temporary tunnel is then torn down.

In one embodiment, the MIP update is performed in accordance with the following pseudo-code:

```
HA=HA1
localHA=HA2
currentHA=HA2
IF {localHA=HA} {
    MIP binding update HA → destBSR
} ELSE {
    MIP binding update localHA → destBSR
    IF {currentHA!=localHA} {
        MIP binding update HA → localHA
    }
}
```

Figure 9A:
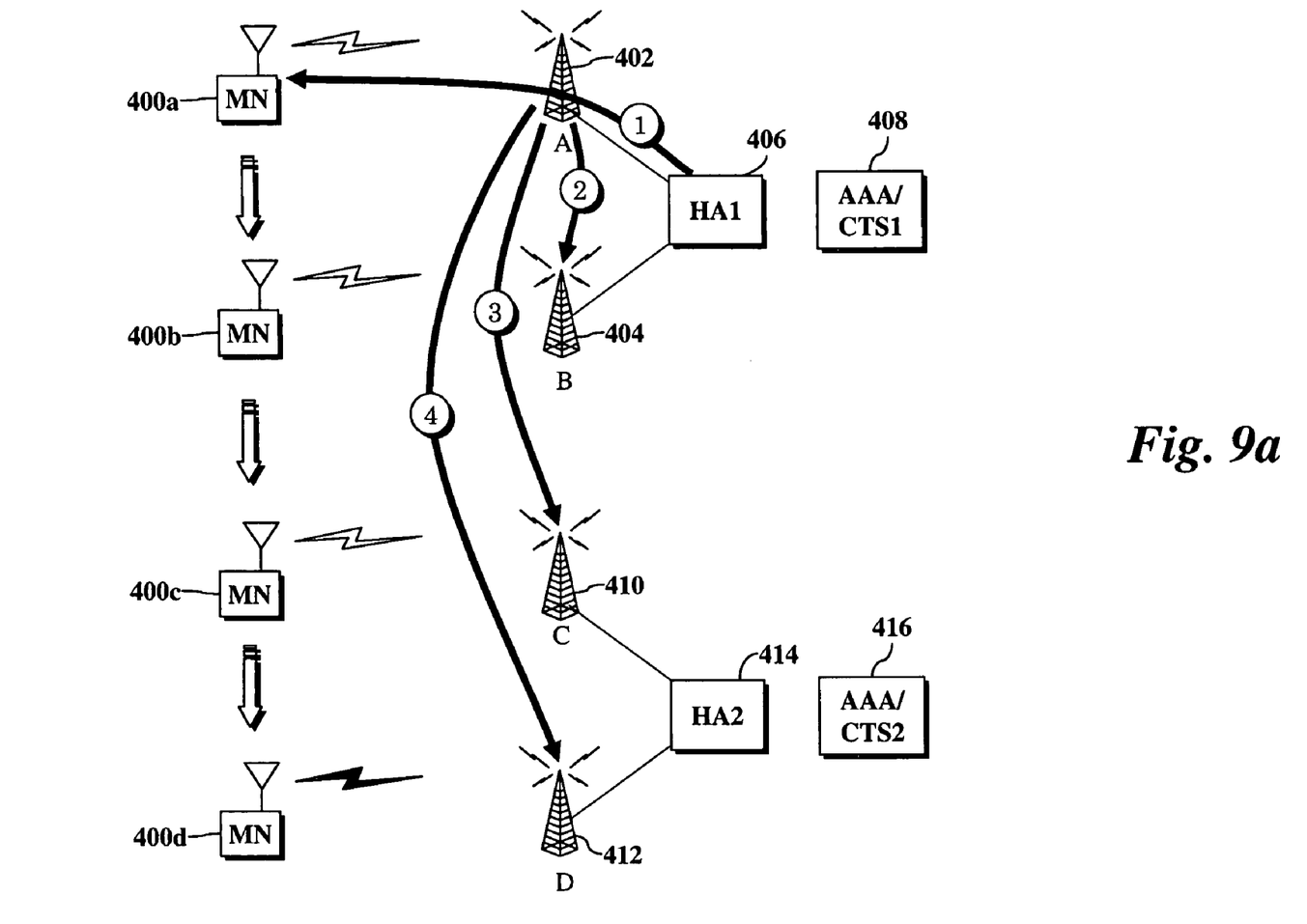
FIGS. 9a-b illustrate an embodiment of a paging process in accordance with the present invention.
Figure 9B:
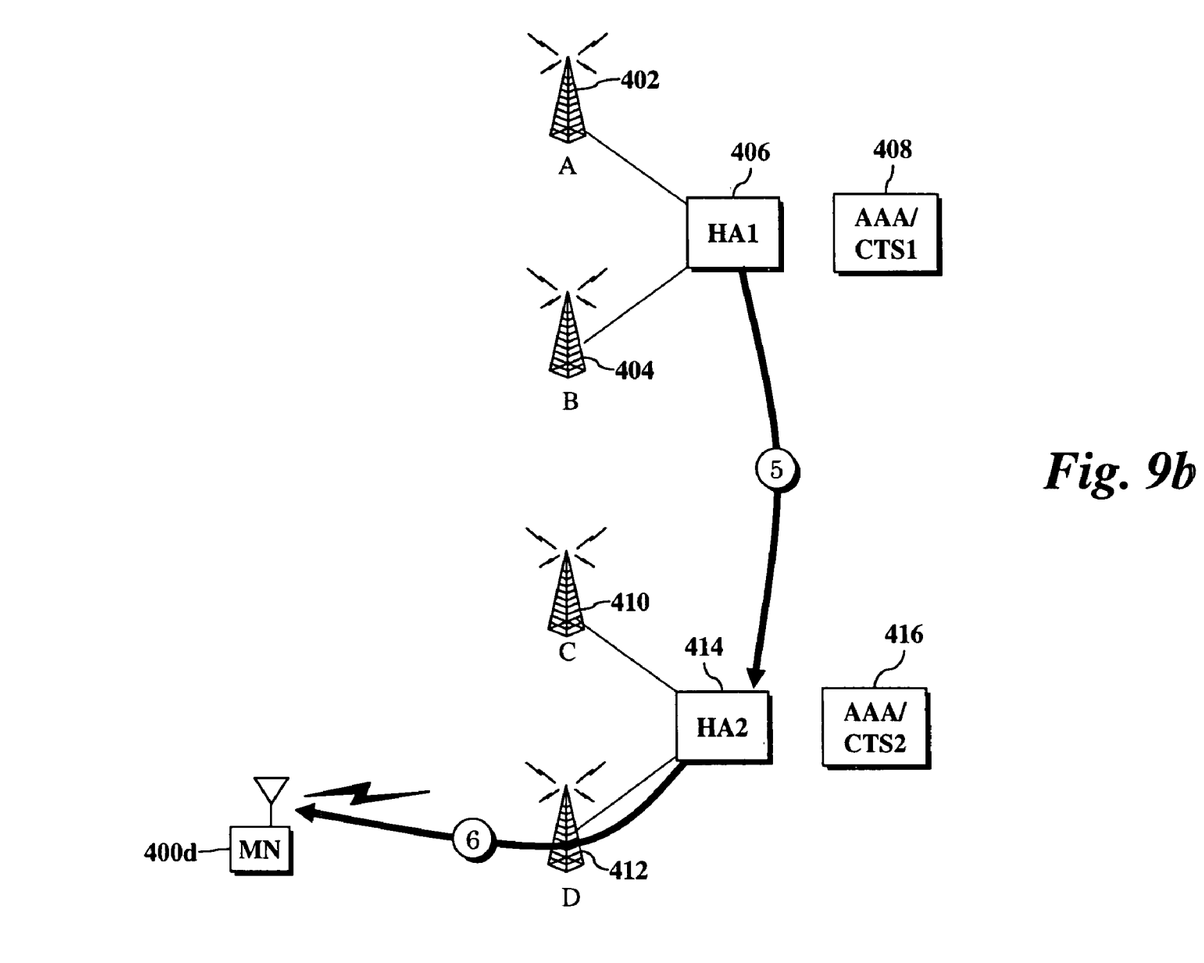

FIGS. 9a-b illustrate an exemplary paging process in accordance with an embodiment of the present invention. Macro-mobility has not been standardized for the fully collapsed base station router architecture. The paging process for the fully collapsed base station router involves the user entering idle mode due to traffic inactivity, and sending a location update to new base station router. A tunnel is established from the source base station router to the destination base station router. Uplink or Downlink traffic forces the destination base station router to page the user. User context establishment is performed via the CTS on the destination base station router or via cache on the base station router. Finally, a MIP update is performed and the temporary tunnel is torn down.

Mobile node 400a is initially active at base station router A, and then enters an idle mode. Communications (1) are provided to mobile node 400a through base station A. Next, the mobile node (reference 400b) roams to base station B, where a communications path (2) is directed to mobile node 400b through base station A, which routes communications to base station B. Next the mobile node roams to base station C. A communications (3) path is established from the home agent, through base station A, which forwards communications to base station C and mobile node 400c. Next, mobile node 400c roams to base station D. As above, a communications path (4) is established from home agent 406 through base station A, which redirects communications to base station D. The mobile node 400d is paged by base station router D, user context established via CTS2 on base station router D (unless context has been previously stored in local cache) and a MIP update via base station router D. Referring to FIG. 9b, a communications path (5) is then set up from HA1 to HA2, and from HA2 to mobile node 400d, via base station router D. The MIP update can be performed in accordance with the following pseudo-code:

```
HA=HA1
localHA=HA2
currentHA=HA1
IF {localHA=HA} {
    MIP binding update HA → destBSR
} ELSE {
    MIP binding update localHA → destBSR
    IF {currentHA!=localHA} {
        MIP binding update HA → localHA
    }
}
```

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. In a wireless communications network having a plurality of base stations and a context transfer server, a method for processing handoff requests between a source base station and a destination base station, comprising the steps, performed by the destination base station, of:
   requesting, from the source base station, an identifier associated with each of a plurality of active mobile nodes registered on the source base station;
   retrieving, from the context transfer server, a context associated with each identified mobile node;
   storing the retrieved contexts in a local cache;
   receiving a handoff request from a first mobile node, the first mobile node having an associated context stored in the local cache; and
   applying the stored context to the first mobile node, wherein the destination base station discovers an Internet Protocol (IP) address of the source base station by performing a handoff process with the source base station, the handoff process including the IP address of the source base station, and storing the IP address of the source base station in the local cache.

2. In a wireless communications network having a plurality of base stations and a context transfer server, a method for processing handoff requests between a source base station and a destination base station, comprising the steps, performed by the destination base station, of:
   requesting, from the source base station, an identifier associated with each of a plurality of active mobile nodes registered on the source base station;
   retrieving, from the context transfer server, a context associated with each identified mobile node;
   storing the retrieved contexts in a local cache;
   receiving a handoff request from a first mobile node, the first mobile node having an associated context stored in the local cache; and
   applying the stored context to the first mobile node,
   wherein the step of storing the retrieved contexts comprises storing a local IP address and a home IP address for each identified mobile node.

3. In a wireless communications network having a plurality of base stations and a context transfer server, a method for processing handoff requests between a source base station and a destination base station, comprising the steps, performed by the destination base station, of:
   requesting, from the source base station, an identifier associated with each of a plurality of active mobile nodes registered on the source base station;
   retrieving, from the context transfer server, a context associated with each identified mobile node;
   storing the retrieved contexts in a local cache;
   receiving a handoff request from a first mobile node, the first mobile node having an associated context stored in the local cache;
   applying the stored context to the first mobile node; and
   for each identified mobile node, setting a timer after an associated context is received and subsequently deleting the stored context for the mobile node after the timer expires.

4. In a wireless communications network having a plurality of base stations and a context transfer server, a method for processing handoff requests between a source base station and a destination base station, comprising the steps, performed by the destination base station, of:
   requesting, from the source base station, an identifier associated with each of a plurality of active mobile nodes registered on the source base station;
   retrieving, from the context transfer server, a context associated with each identified mobile node;
   storing the retrieved contexts in a local cache;
   receiving a handoff request from a first mobile node, the first mobile node having an associated context stored in the local cache; and
   applying the stored context to the first mobile node, including the steps of:
      establishing a temporary communications tunnel with the source base station;
      receiving, at the destination base station through the temporary communications tunnel, IP packets directed to a first local IP address of the first mobile node;
      instructing a home agent to direct IP communications addressed to the first local IP address to the destination base station; and
      removing the temporary communications tunnel.

5. In a wireless communications network having a plurality of base stations and a context transfer server, a method for processing handoff requests between a source base station and a destination base station, comprising the steps, performed by the destination base station, of:
   requesting, from the source base station, an identifier associated with each of a plurality of active mobile nodes registered on the source base station;
   retrieving, from the context transfer server, a context associated with each identified mobile node;
   storing the retrieved contexts in a local cache;
   receiving a handoff request from a first mobile node, the first mobile node having an associated context stored in the local cache; and
   applying the stored context to the first mobile node, including the steps of:
      designating a second local IP address for the first mobile node, the second local IP address providing a care of address on the destination base station; and
      instructing the home agent to direct IP communications to the second local IP address on the destination base station.

6. In a communications network facilitating wireless Internet Protocol (IP) communications, a base station router having a fully collapsed architecture comprising:
   a base transceiver system for facilitating wireless communications with a plurality of mobile nodes;

a packet data serving node facilitating communications with an external packet data network, the packet data serving node including a foreign agent function for assigning local IF addresses to roaming mobile nodes;

a storage means for storing contexts of mobile nodes active on identified neighboring base stations;

a program memory including program logic for instructing a processor to poll neighboring base stations for identifiers associated with the active mobile nodes, request from the context transfer server the contexts of the identified active mobile nodes, and store contexts received from the context transfer server in the storage means;

a base station controller for processing a handoff request from a first mobile node, including registering the first mobile node for communication with the base station router and applying a corresponding stored context to the first mobile node; and an interface facilitating data communication with a home agent.

7. The base station of claim 6 wherein the program memory further comprises a neighbor discovery function for retrieving a neighbor base station IP address from a handoff process and storing the retrieved neighbor base station IP address in the storage means.

8. The base station of claim 6 wherein the program memory further comprises a neighbor discovery function for retrieving a neighbor base station IP address from a domain host control protocol (DHCP) service discovery.

9. The base station of claim 6 wherein the mobile node identifiers include IP addresses associated with the active mobile nodes.

10. The base station of claim 9 wherein the foreign agent function is further adapted to receive, from a home network, data communications directed to an IP address of the first mobile node.

11. The base station of claim 6 wherein the storage means is adapted to store a local IP address and a home IP address for each identified mobile node.

12. The base station of claim 6 wherein the program memory further comprises a timer function including setting a timer for each identifier mobile node when associated context information is received and deleting the mobile node identifier and associated context from the cache when the timer expires.

13. The base station of claim 6 wherein the base station controller is further adapted to establish a temporary communications tunnel with the source base station, receive, at the destination base station through the temporary communications tunnel, IP packets directed to the first mobile node, instruct the home agent to direct IP communications directed to the first local IP address to the destination base station, and remove the temporary communications tunnel.

* * * * *